United States Patent [19]

Gibas

[11] Patent Number: 4,783,051
[45] Date of Patent: Nov. 8, 1988

[54] MAGNETIC VALVE

[75] Inventor: Christoph Gibas, Neunkirchen, Fed. Rep. of Germany

[73] Assignee: Flutec Fluidtechnische Gerate GmbH, Sulzbach/Saar, Fed. Rep. of Germany

[21] Appl. No.: 36,000

[22] PCT Filed: Aug. 6, 1986

[86] PCT No.: PCT/DE86/00321
§ 371 Date: Apr. 1, 1987
§ 102(e) Date: Apr. 1, 1987

[87] PCT Pub. No.: WO87/00903
PCT Pub. Date: Feb. 12, 1987

[30] Foreign Application Priority Data

Aug. 7, 1985 [DE] Fed. Rep. of Germany ....... 3528296

[51] Int. Cl.$^4$ ............................................. F16K 31/06
[52] U.S. Cl. .................................. 251/129.19; 251/88
[58] Field of Search ...................... 251/129.19, 84, 88

[56] References Cited

U.S. PATENT DOCUMENTS

| 2,114,961 | 4/1938 | Gille | 251/129.19 X |
| 2,223,986 | 12/1940 | Eatop | 251/129.19 X |
| 2,698,159 | 12/1954 | Crum | 251/129.19 |
| 3,970,282 | 7/1976 | Hansen | 251/129.19 X |

Primary Examiner—Arnold Rosenthal
Attorney, Agent, or Firm—Roylance, Abrams, Berdo & Goodman

[57] ABSTRACT

A magnetic valve has an actuation magnet (1), whose armature (17) serves to move a valve element (23) against the action of a valve spring (21). To increase the efficiency of the actuation magnet, the valve element (23) armature (17) are connected to one another in such a way that the valve element can adjust itself axially and radially in relation to the magnet armature.

3 Claims, 2 Drawing Sheets

MAGNETIC VALVE

FIELD OF THE INVENTION

The present invention relates to a solenoid valve having a connection between the armature and valve member permitting relative axial and radial movement.

BACKGROUND OF THE INVENTION

In a known solenoid valve on this type disclosed in DE-GM No. 69 04 282, the valve member is configured as a disk so that it need not be aligned with the axis of the stationary valve seat for a tight fit. The closing spring is mounted in a borehole of the armature. This spring serves as the base of a support bolt engaging in the armature.

Another known solenoid valve, disclosed in DE-OS No. 27 40 646, has a valve member with spherical seat parts arranged at its ends, of which the heads are turned toward each other. The shaft connecting the spherical seat parts is guided in a borehole. A spring, exerting a closing force on the adjacent ball part resting on its valve seat, is provided at each end of the valve member.

A solenoid valve disclosed in DE-OS No. 22 08 183 has an adjustable connection between the armature and the valve member, and has a spherical bearing.

A solenoid valve disclosed in DE-AS No. 12 49 043 has an anti-adhesion disk between the armature and the pole shoe.

SUMMARY OF THE INVENTION

An object of the present invention is to provide a solenoid valve wherein the valve closing involves a tight fit of the valve member with a conical seat.

The foregoing object is obtained by a solenoid valve, comprising a control magnet, an armature mounted within the magnet for reciprocating movement, a conical valve seat, and a valve member movable toward and away from the valve seat. The armature and valve member are connected such that the armature actuates movement of the valve member relative to the valve seat and permits limited relative axial and radial movement of the armature and the valve member. The armature-valve member coupling includes an annular groove in the valve member and a sliding disk fixed against the armature by a flanged, ring-like protection. The sliding disk is generally U-shaped and insertable in a radial direction into the annular groove in the valve member. The groove has axial ends defined by shoulders on the valve member. The shoulders are spaced apart by a distance greater than the thickness of the sliding disk to permit the limited relative axial movement between the armature and the valve member.

The sliding or adjustable connection provides a tight fit of the valve member to its valve, since the valve member can be adjusted axially and radially. The connection is of a simple nature, and can be manufactured without great cost. The armature can be fitted with relatively small clearance in the magnet housing.

To allow the movable valve member a good fit on the stationary valve seat, when the valve member has a spherical seat part, it is traditional to allow the valve member radial adjustability while it is also linked with the armature. With such an adjustability, however, the valve member cannot be tightly closed, see e.g., DE-GM No. 69 04 282.

The valve member can be mounted in a bore in the armature with a spherical bearing to prevent friction between the armature and the valve member during reciprocal radial movement.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF PREFERRED EMBODIMENT

Figure 1:
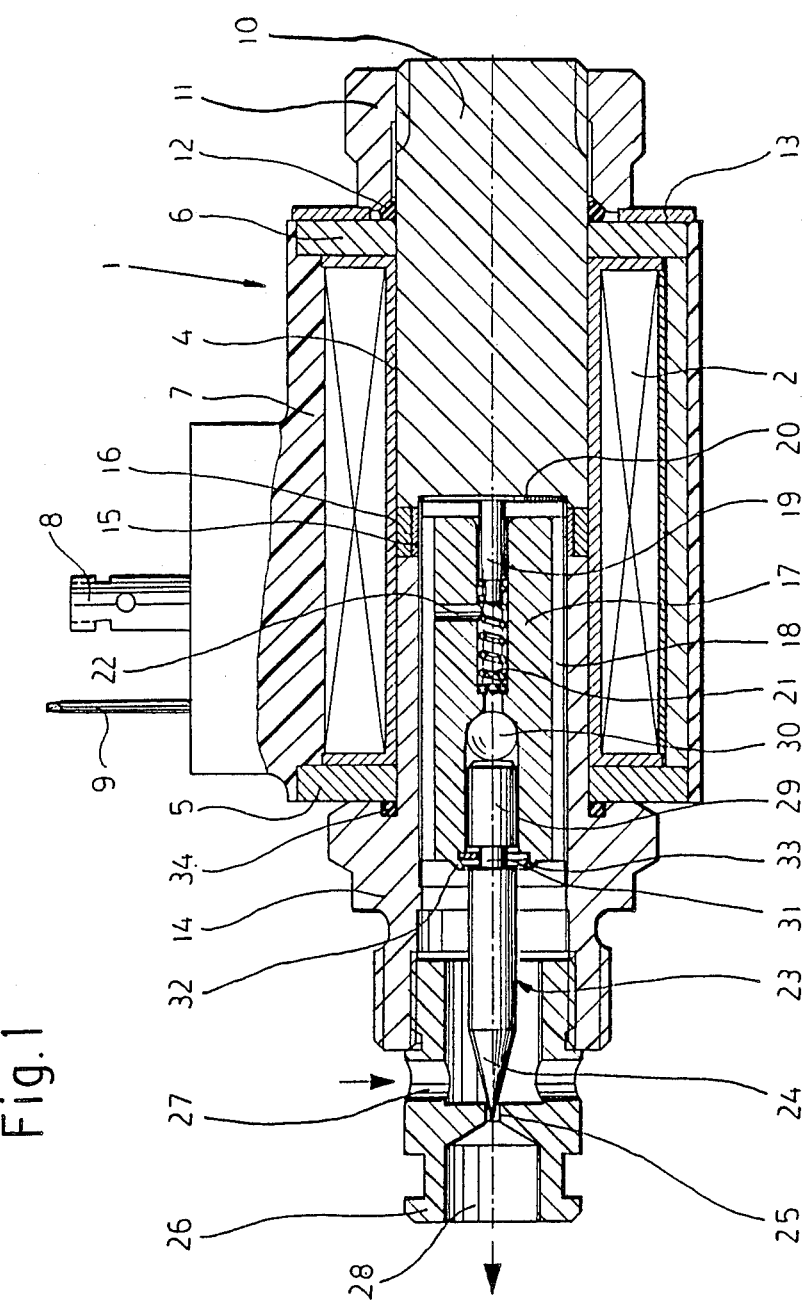
FIG. 1 is a side elevational view in section of a solenoid valve according to the present invention.

The solenoid valve according to the present invention comprises a control magnet 1 with an exciter winding 2 wound on a coil 4. Casing rings 5 and 6 are provided on the axial ends of coil 4. The outside of exciter winding 2 and the periphery of each casing ring 5, 6 is covered by a plastic cover 7, into which parts thereof are embedded. Two plug members 8 and a protective conductor connection 9 extend above a projecting part of cover 7, and are electrically connected with the exciter winding.

A pole shoe 10 is engaged in coil 4 from the right side as viewed in the drawing of FIG. 1. A retaining nut 11 is threaded onto the exposed end of pole shoe 10 and projects over coil 4. Between retaining nut 11 and casing ring 6, a packing ring 12 is arranged. A clamp plate 13 is clamped and held between retaining nut 11 and casing ring 6, and surrounds packing ring 12.

A magnet housing 14 projects into coil 4 from the left side as viewed in the drawing of FIG. 1. The magnet housing shoulder has a polygonal portion engaging casing ring 5. An outside thread is formed on the magnet housing end opposite pole show 10. Between pole shoe 10 and magnet housing 14, a spacer ring 15 is located. Pole shoe 10 is connected with magnet housing 14 by a connection ring 16, surrounding spacer ring 15 and consisting of soldered metal, especially brass solder. Rings 15 and 16 are of nonmagnetic material.

Magnet housing 14 is hollow. Pole shoe 10 has smooth blind hole or bore receiving an armature 17. The armature is guided for axial movement with only slight radial clearance in magnet housing 14 and in pole shoe 10. Magnet housing 14 and pole shoe 10 form a pressure-resistance housing for armature 17. The armature has lengthwise ribs 18 and can be moved along magnet housing 14. A bolt 19 of nonmagnetic material is mounted in a central axial borehole or bore of armature 17. The armature borehole has different diameters along its length, as seen in FIG. 1 from right to left. A collar 20 is arranged between armature 17 and the base of pole shoe 10, in order to prevent magnetic adherence of armature 17 to pole shoe 10. A valve spring 21 is supported on bolt 19 at its right end and on an internal armature shoulder at its left end as viewed in FIG. 1. A cross bore 22 connects the interior armature space receiving valve spring 21 with the outside of armature 17.

A valve member 23 of tempered steel is arranged to the left of armature 17, as viewed in the drawing of FIG. 1, and comprises a spherical seat 24 which cooperates with a center conical valve seat 25 in a valve housing 26 threaded into magnet housing 14. Valve housing 26 has radial feed bores 27 and an axial discharge bore 28, and has a passage through it.

Figure 2:
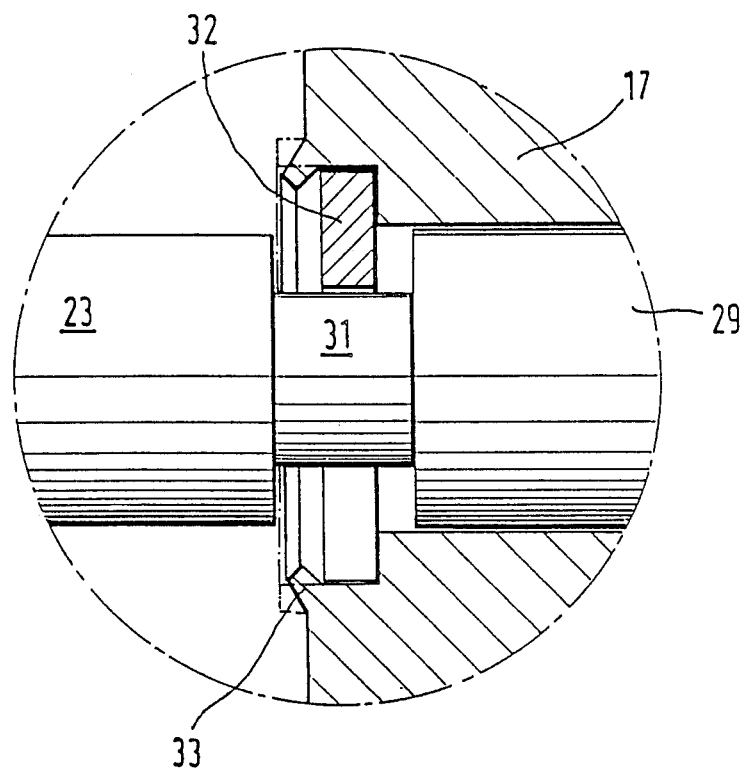
FIG. 2 is an enlarged, partial side elevational view in section of the solenoid valve of FIG. 1.

Valve member 23 comprises a valve shaft 29 received with a radial clearance in the axial central bore of armature 17 and supported in axial direction on a tempered and polished spherical bearing 30. Bearing 30 rests tightly in armature 17, and is contiguous to a shoulder in the center bore of armature 17. Valve shaft 29 has an angular groove 31 receiving a sliding disk 32 introduced radially from the side with axial slide clearance and radial clearance. Slide disk 32 is linked with armature 17 by connection ring 33 formed by an inwardly bent flange made as one integral piece with armature 17. The details of the armature-valve member connection are best illustrated in FIG. 2.

A seal washer 34 is introduced into magnet housing 14 between magnet housing 14 and casing ring 5.

The solenoid valve is illustrated in FIG. 1 in its closed position. Under the force of valve spring 21 and the pressure of the pressure medium on the free section of valve seat 25, the seat 24 of valve member 23 is held on valve seat 25 of valve housing 26. The connection between feed bores 27 and discharge bore 28 is blocked.

To connect feed bores 27 with discharge bore 28, control magnet 1 is energized. Armature 17 is moved to the right, as viewed in the drawing of FIG. 1, counter to the force of valve spring 21. The slide connection between armature 17 and valve member 23 moves valve member 23 only, after armature 17 has been thrust back a certain distance. The valve then is opened so that pressure medium flows from feed bores 27 into discharge bore 28. As soon as the slide connection is effected, with the movement of armature 17, the pressure of the pressure medium working on the free cross section of valve seat 25 must also be overcome. In this case armature 17 is already in movement after overcoming its mass moment of inertia.

If the solenoid valve is to be closed again, control magnet 1 is disconnected from its electric current source. Armature 17 is moved to the left in the drawing of FIG. 1 under the force of valve spring 21. Due to the central transver of force caused by spherical bearing 30 on the flat end surface of valve shaft 29, the armature operation avoids disadvntageous and interfering bending and tipping torques. After a short thrust path, armature 17 picks up and moves valve member 23. The valve member, due to its radial and axial mobility, can be easily coaxially adjusted relative to armature 17 to fit or be aligned with valve seat 25 in valve housing 26 when the solenoid valve is closed.

While a particular embodiment has been chosen to illustrate the invention, it will be understood by those skilled in the art that various changes and modifications can be made therein without departing from the scope of the invention as defined in the appended claims.

I claim:

1. A solenoid valve, comprising:
    a control magnet;
    an armature mounted within said magnet for reciprocating movement;
    a conical valve seat;
    a valve member movable toward and away from said valve seat; and
    coupling means for connecting said armature and said valve member such that said armature actuates movement of said valve member relative to said valve seat and for permitting limited relative axial and radial movement of said armature and said valve member, said coupling means including an annular groove in said valve member and a sliding disk fixed against said armature by a flanged, ring-like projection, said sliding disk being generally U-shaped and insertable in a radial direction into said annular groove in said valve member, said groove having axial ends defined by shoulders on said valve member, said shoulders being spaced apart by a distance greater than a thickness of said sliding disk to permit the limited relative axial movement between said armature and said valve member.

2. A solenoid valve according to claim 1 wherein said armature comprises an axial bore and a spherical bearing mounted in said bore, a portion of said valve member remote from said valve seat being received in said bore and engaging said spherical bearing.

3. A solenoid valve according to claim 2 wherein said bore in said armature receives a valve spring and a bolt, said bolt having a collar on an axial end thereof remote from said valve member, said collar being fixedly attached to a stationary member of said control magnet.

* * * * *